US012151382B2

(12) United States Patent
Hashiguchi

(10) Patent No.: US 12,151,382 B2
(45) Date of Patent: Nov. 26, 2024

(54) REMOTE OPERATION SYSTEM, REMOTE OPERATION METHOD, AND REMOTE OPERATION PROGRAM

(71) Applicant: TOYOTA JIDOSHA KABUSHIKI KAISHA, Toyota (JP)

(72) Inventor: Yuka Hashiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/696,181

(22) Filed: Mar. 16, 2022

(65) Prior Publication Data

US 2022/0297300 A1 Sep. 22, 2022

(30) Foreign Application Priority Data

Mar. 18, 2021 (JP) ................................ 2021-044591

(51) Int. Cl.
*B25J 9/00* (2006.01)
*B25J 9/16* (2006.01)
(52) U.S. Cl.
CPC .................................. *B25J 9/1689* (2013.01)
(58) Field of Classification Search
CPC ...... B25J 9/1689; B25J 9/1661; B25J 9/1697; B25J 11/008; B25J 13/00; B25J 5/00
See application file for complete search history.

(56) References Cited

U.S. PATENT DOCUMENTS

| | | | | |
|---|---|---|---|---|
| 10,350,757 | B2 * | 7/2019 | Erhart | B25J 11/0005 |
| 10,661,433 | B2 * | 5/2020 | Angle | G16H 20/13 |
| 11,787,061 | B2 * | 10/2023 | Yeo | B25J 5/007 |
| | | | | 700/264 |
| 11,914,398 | B2 * | 2/2024 | Ha | G05D 1/6987 |
| 2018/0154514 | A1 * | 6/2018 | Angle | G16H 20/13 |
| 2019/0084161 | A1 * | 3/2019 | Tokuhashi | B25J 13/006 |
| 2019/0335341 | A1 * | 10/2019 | Ju | B25J 9/16 |
| 2020/0053324 | A1 * | 2/2020 | Deyle | G01C 21/20 |
| 2022/0258357 | A1 * | 8/2022 | Yeo | B25J 13/08 |
| 2022/0390958 | A1 * | 12/2022 | Ha | H04W 4/33 |

FOREIGN PATENT DOCUMENTS

JP 5070441 B2 11/2012
JP 2020138255 A 9/2020

* cited by examiner

*Primary Examiner* — Ian Jen
(74) *Attorney, Agent, or Firm* — Dinsmore & Shohl LLP

(57) ABSTRACT

A remote operation system, a remote operation method, and a remote operation program capable of preventing the burden on one remote operator when this person remotely operates a plurality of robots in parallel from increasing are provided. In a remote operation system, a remote operator remotely operates a plurality of robots, and a service can be provided as a result of execution of a plurality of tasks for a service receiver. The remote operation system includes a task allocation unit configured to allocate a plurality of tasks to the plurality of respective robots and a remote operation condition granting unit configured to grant, to the plurality of respective robots, remote operation conditions in accordance with the content of the plurality of tasks that have been allocated to the plurality of respective robots.

6 Claims, 12 Drawing Sheets

REMOTE OPERATION SYSTEM, REMOTE OPERATION METHOD, AND REMOTE OPERATION PROGRAM

CROSS REFERENCE TO RELATED APPLICATIONS

This application is based upon and claims the benefit of priority from Japanese patent application No. 2021-044591, filed on Mar. 18, 2021, the disclosure of which is incorporated herein in its entirety by reference.

BACKGROUND

The present disclosure relates to a remote operation system, a remote operation method, and a remote operation program, and in particular, to a remote operation system, a remote operation method, and a remote operation program that remotely operate a plurality of robots.

One example of a remote operation system is disclosed in Japanese Patent No. 5070441. In this example of a remote operation system, a predetermined operation terminal is selected based on a condition list regarding conditions that an operator who remotely operates a robot should satisfy and terminal information including attribute information of the operator. Accordingly, this operator is determined by selecting one of a plurality of candidates for a remote operator.

SUMMARY

The present inventors have found the following problems with the above example of a remote operation system.

There are services that include tasks requiring communication and are difficult for a single robot to provide. These services include, for example, a service that captures a photo of a group including a user and a robot.

In the above services, according to the aforementioned technique, a plurality of remote operators execute tasks by remotely operating a plurality of respective robots allocated to the respective remote operators, thereby providing the service for a user. However, the remote operators need to communicate with one another in order to determine the tasks that should be executed by the respective remote operators.

On the other hand, if a task is executed by one remote operator remotely operating a plurality of robots, one remote operator needs to perform a plurality of remote operations in parallel, which may cause an increase in the burden on one remote operator.

The present disclosure has been made in view of the aforementioned problem and aims to provide a remote operation system, a remote operation method, and a remote operation program for preventing an increase in the burden on one remote operator when this person remotely operates a plurality of robots in parallel.

A remote operation system according to the present disclosure is a remote operation system in which a remote operator remotely operates a plurality of robots and in which a service can be provided as a result of execution of a plurality of tasks for a service receiver, the remote operation system including:
a task allocation unit configured to allocate the plurality of tasks to the plurality of respective robots; and
a remote operation condition granting unit configured to grant, to the plurality of respective robots, remote operation conditions in accordance with the content of the plurality of tasks that have been allocated to the plurality of respective robots.

According to the aforementioned configuration, the remote operation conditions are defined in accordance with the content of the plurality of allocated tasks, and a plurality of robots can thus be remotely operated. Therefore, the whole amount of the remote operation is reduced by the remote operation conditions. It is therefore possible to prevent an increase in the burden on one remote operator when this person remotely operates a plurality of robots in parallel.

Further, the plurality of robots may include first and second robots,
the plurality of tasks may include a first task allocated to the first robot and a second task allocated to the second robot,
the first robot may communicate with the service receiver and execute the first task by a remote operation performed by the remote operator in accordance with the remote operation condition, and
the second robot may execute the second task by autonomous control in accordance with the remote operation condition.

According to the aforementioned configuration, at least a part of the second task can be executed by autonomous control by the second robot. Therefore, at least a part of the remote operation of the second robot by the remote operator can be omitted. Accordingly, the remote operator is able to concentrate on remotely operating the first robot, whereby the burden on the remote operator regarding the remote operation can be reduced.

Further, the first robot may communicate, by the remote operation performed by the remote operator, with the service receiver in a position where a group photo that shows the service receiver and the first robot can be captured, and
the second robot may capture the group photo by autonomous control using an image-capturing apparatus.

According to the aforementioned configuration, a group photo can be captured by autonomous control. Therefore, at least a part of the remote operation of the second robot can be omitted. Accordingly, the remote operator is able to concentrate on remotely operating the first robot, whereby the burden on the remote operator regarding the remote operation can be reduced. Accordingly, a service that captures a group photo that shows the service receiver and the first robot while communicating with the service receiver can be provided.

Further, the second robot may adjust, by autonomous control, the angle of view before capturing the group photo using the image-capturing apparatus.

According to the aforementioned configuration, the angle of view can be adjusted by autonomous control. Therefore, at least a part of the remote operation of the second robot can be omitted.

Further, the second robot may capture the group photo, then print the group photo and acquire the printed photo by autonomous control in accordance with the granted remote operation condition, and
the first robot may grip the printed photo by autonomous control, and then hand the printed photo to the service receiver by the remote operation performed by the remote operator.

According to the aforementioned configuration, the printed photo can be acquired by autonomous control and the printed photo can be handed to the service receiver by the remote operation. Therefore, at least a part of the remote operation of the second robot can be omitted, and the printed photo can be handed to the service receiver in accordance with the body of the service receiver, for example, the height of the body or the height of his/her hand by the remote operation of the first robot.

Further, the first robot may communicate with the service receiver by the remote operation performed by the remote operator, and the second robot may convey an article to the service receiver by autonomous control in accordance with the remote operation condition.

According to the aforementioned configuration, an article can be conveyed to the service receiver by autonomous control. Therefore, at least a part of the remote operation of the second robot can be omitted. Therefore, the remote operator is able to concentrate on remotely operating the first robot, whereby the burden on the remote operator regarding the remote operation can be reduced. Accordingly, the service that an article is received from or distributed to a service receiver can be provided while communicating with the service receiver.

Further, the first robot communicates with the service receiver by the remote operation performed by the remote operator, and the second robot may move to a place near the service receiver while holding a container and receives an article so that the article is placed on the container by autonomous control in accordance with the remote operation condition.

According to the aforementioned configuration, by autonomous control, the article can be received from the service receiver. Therefore, at least a part of the remote operation of the second robot can be omitted. Accordingly, the remote operator is able to concentrate on remotely operating the first robot, whereby the burden on the remote operator regarding the remote operation can be reduced. Accordingly, the service that receives an article from a service receiver while communicating with the service receiver can be provided.

A remote operation method according to the present disclosure is a remote operation method executed in a remote operation system in which a remote operator remotely operates a plurality of robots and in which a service can be provided as a result of execution of a plurality of tasks for a service receiver, the remote operation method including:

allocating the plurality of tasks to the plurality of respective robots; and granting, to the plurality of respective robots, remote operation conditions in accordance with the content of the plurality of tasks that have been allocated to the plurality of respective robots.

According to the aforementioned configuration, the remote operation conditions are defined in accordance with the content of the plurality of allocated tasks, and a plurality of robots can thus be remotely operated. Therefore, the whole amount of the remote operation is reduced by the remote operation conditions. It is therefore possible to prevent the increase in the burden on one remote operator when this person remotely operates a plurality of robots in parallel.

A remote operation program according to the present disclosure is a remote operation program executed by a computer that operates as a server in a remote operation system in which a remote operator remotely operates a plurality of robots via the server, and in which a service can be provided as a result of execution of a plurality of tasks for a service receiver, the remote operation program causing the computer to execute the following processing of:

allocating the plurality of tasks to the plurality of respective robots; and granting, to the plurality of respective robots, remote operation conditions in accordance with the content of the plurality of tasks that have been allocated to the plurality of respective robots.

According to the aforementioned configuration, the remote operation conditions are defined in accordance with the content of the plurality of allocated tasks, and a plurality of robots can thus be remotely operated. Therefore, the whole amount of the remote operation is reduced by the remote operation conditions. It is therefore possible to prevent the increase in the burden on one remote operator when this person remotely operates a plurality of robots in parallel.

According to the present disclosure, it is possible to prevent the increase in the burden on one remote operator when this person remotely operates a plurality of robots in parallel.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. It should be noted, however, that the present disclosure is not limited to the following embodiments. Further, the following description and the drawings are simplified as appropriate for the sake of clarification of explanation.

First Embodiment

Hereinafter, with reference to the drawings, a first embodiment will be described.

Referring first to FIGS. 1 to 6, a configuration and an operation of a remote operation system according to this embodiment will be described. Then, with reference to FIGS. 7 to 12, a plurality of examples of the operation of the remote operation system according to this embodiment will be described. As a matter of course, the right-handed XYZ-coordinate system shown in FIG. 1 and the other drawings is used for the sake of convenience to illustrate a positional relation among components. In general, as is common among the drawings, a Z-axis positive direction is a vertically upward direction and an XY-plane is a horizontal plane.

Remote Operation System

Figure 1:
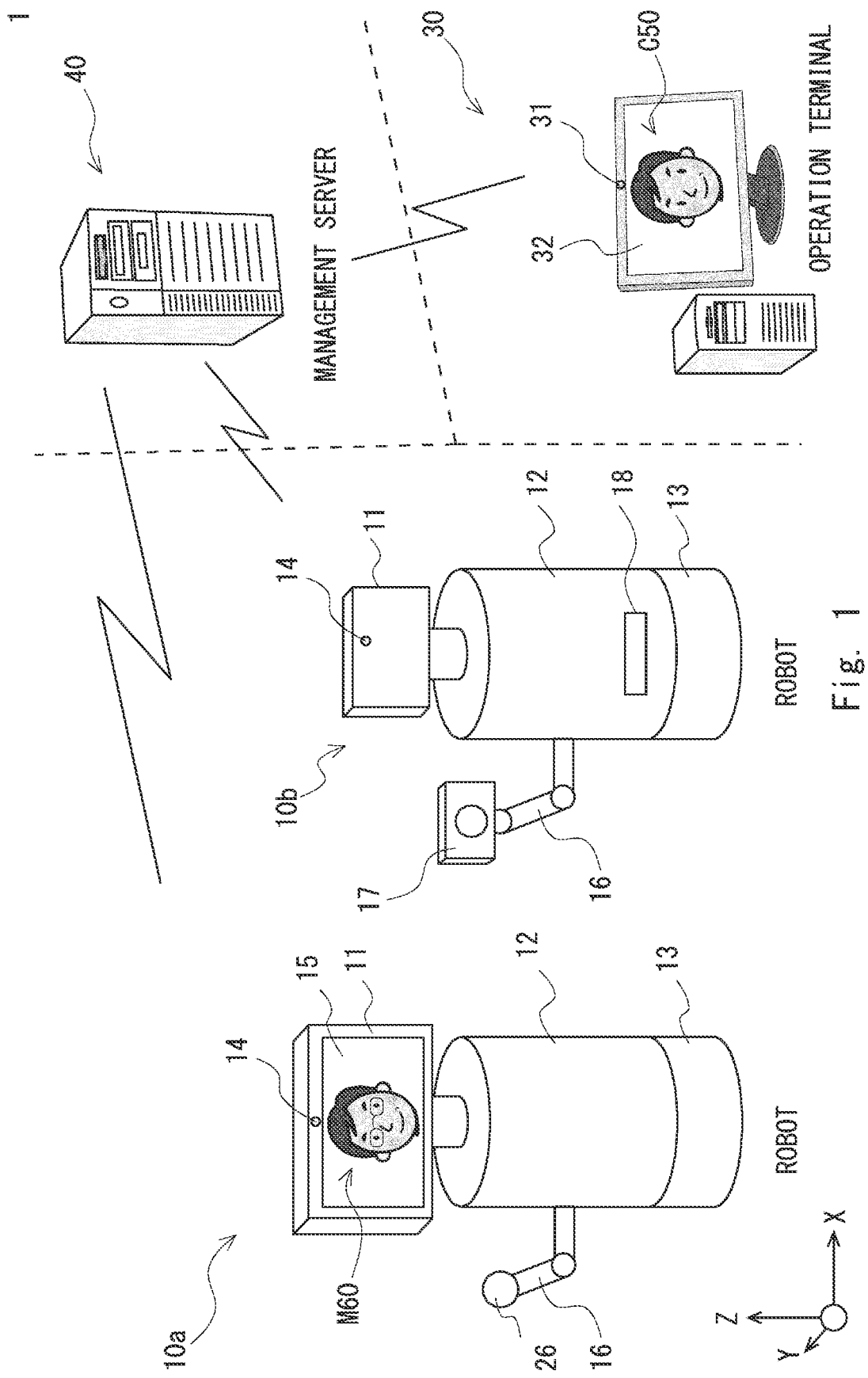
FIG. 1 is a schematic view showing a configuration of a remote operation system according to a first embodiment.

FIG. 1 is a diagram for describing a remote operation system according to an embodiment. As shown in FIG. 1, a remote operation system 1 according to this embodiment includes a robot 10a, a robot 10b, an operation terminal 30, and a management server 40. The remote operation system 1 according to this embodiment is a remote operation system for enabling an operator who is remotely operating the robots 10a and 10b using the operation terminal 30 to communicate with a service receiver C50 (see FIG. 2) who is present near the robots 10a and 10b via the robots 10a and 10b.

Specifically, the robots 10a and 10b are disposed in positions away from the operation terminal 30, and a remote operator M60 is able to remotely operate the robots 10a and 10b using the operation terminal 30. The robot 10a, the robot 10b, and the operation terminal 30 are configured in such a way that they can communicate with one another via the management server 40. The robot 10a is provided with a camera A (14) and a display unit 15. The robot 10b is provided with a camera A (14). Further, the operation terminal 30 is provided with a camera C (31) and a display unit 32. An image of the service receiver C50 (see FIG. 2) who is present in front of the robot 10a is captured by the camera A (14) of the robot 10a. Then, the image of the service receiver C50 that has been captured is displayed on the display unit 32 of the operation terminal 30 of the remote operator M60. Likewise, an image of the remote operator M60 who is operating the operation terminal 30 is captured by the camera C (31) of the operation terminal 30. The image of the remote operator M60 that has been captured is displayed on the display unit 15 of the robot 10a. Further, each of the robot 10a and the operation terminal 30 is provided with a microphone and a speaker. Therefore, the service receiver C50 and the remote operator M60 are able to make a face-to-face conversation and communicate with each other.

Figure 2:
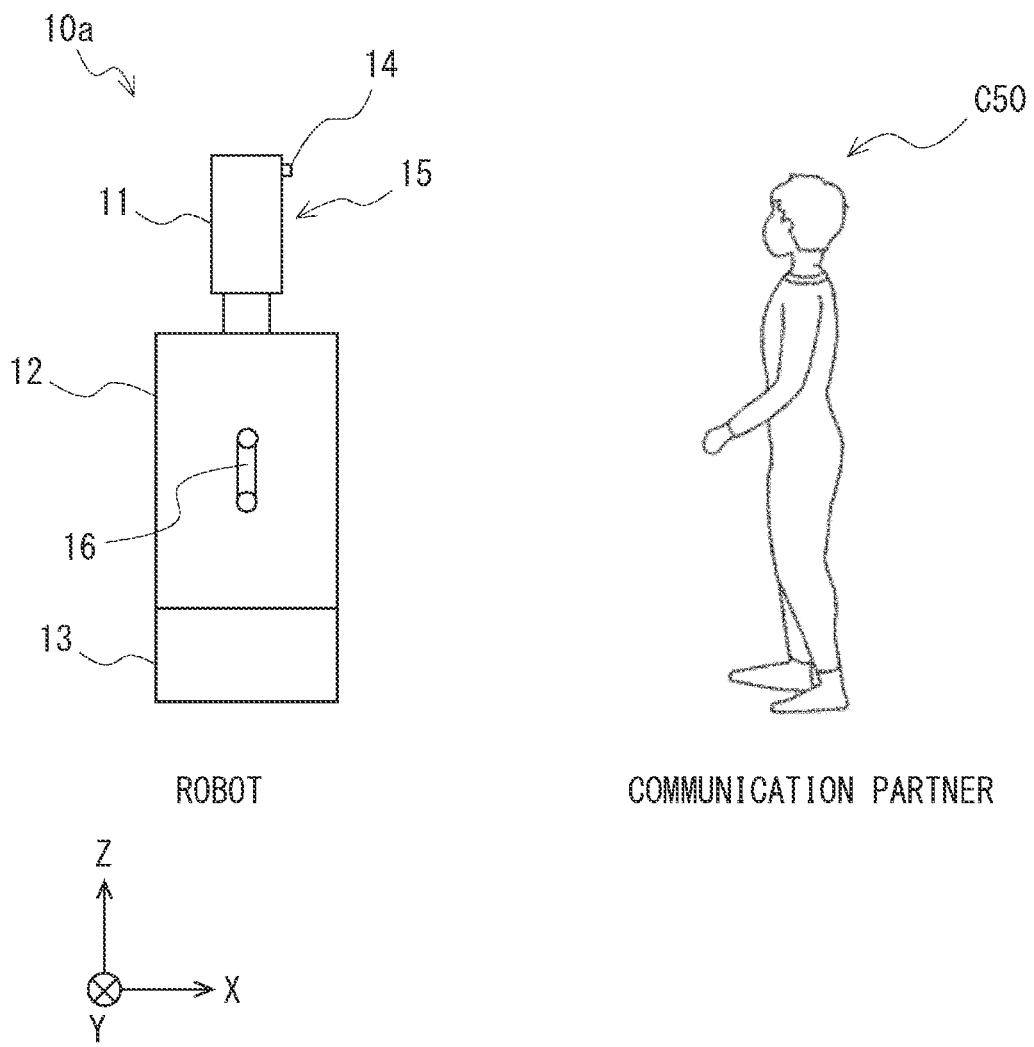
FIG. 2 is a side view showing a state in which an operator of a robot communicates with a communication partner via the robot.

Further, as shown in FIG. 2, the remote operation system 1 according to this embodiment is configured to be able to capture a photo of the service receiver C50 who is in front of the robot 10a using a camera B (17) for capturing photos. Hereinafter, the configuration and the operation of the remote operation system 1 according to this embodiment will be described in detail.

As shown in FIG. 1, the remote operation system 1 according to this embodiment includes the robot 10a, the robot 10b, the operation terminal 30, and the management server 40. The robot 10a and the robot 10b, which are disposed in positions away from the operation terminal 30, are configured in such a way that they can communicate with one another via the management server 40. The management server 40 may be disposed in a position away from the robot 10a, the robot 10b, and the operation terminal 30, near the operation terminal 30, or near the robots 10a and 10b.

Configuration of Robots

First, a configuration of the robots will be described. As shown in FIGS. 1 and 2, the robots 10a and 10b each includes a head 11, a body 12, and a mobile unit 13. The head 11 of the robot 10a is provided with the camera A (14) and the display unit 15. The head 11 of the robot 10b is provided with the camera A (14). The camera A (14), which is a camera used for main operations of the robots 10a and 10b, can be used, for example, to detect the presence or the absence of an obstacle when the robots 10a and 10b move or to search for the service receiver. Further, the camera A (14) is used when the remote operator M60 of the operation terminal 30 communicates with the service receiver C50 (see FIG. 2) who is present in front of the robot 10a. The display unit 15 displays the remote operator M60 who performs the remote operation using the operation terminal 30.

An arm 16 is attached to the body 12. A gripping part 26 is attached to the tip of the arm 16 of the robot 10a. The camera B (17) is attached to the tip of the arm 16 of the robot 10b. The camera B (17) is used to capture photos of the service receiver C50 (see FIG. 2). The position of the gripping part 26 can be adjusted using the arm 16 of the robot 10a. The position of the camera B (17) can be adjusted using the arm 16 of the robot 10b.

Further, the body 12 of the robot 10b is provided with a take-out port 18. For example, the robot 10b, which includes a printer (not shown in FIG. 1) therein, is able to capture a photo of the service receiver C50 (see FIG. 2) and then print the photo using the printer to acquire the printed photo. This printed photo can be handed to the service receiver C50 via the take-out port 18.

The mobile unit 13 is a unit for enabling the robots 10a and 10b to move. For example, the mobile unit 13 is provided with wheels (not shown) in its lower surface. By driving these wheels, the robots 10a and 10b can be moved.

Figure 3:
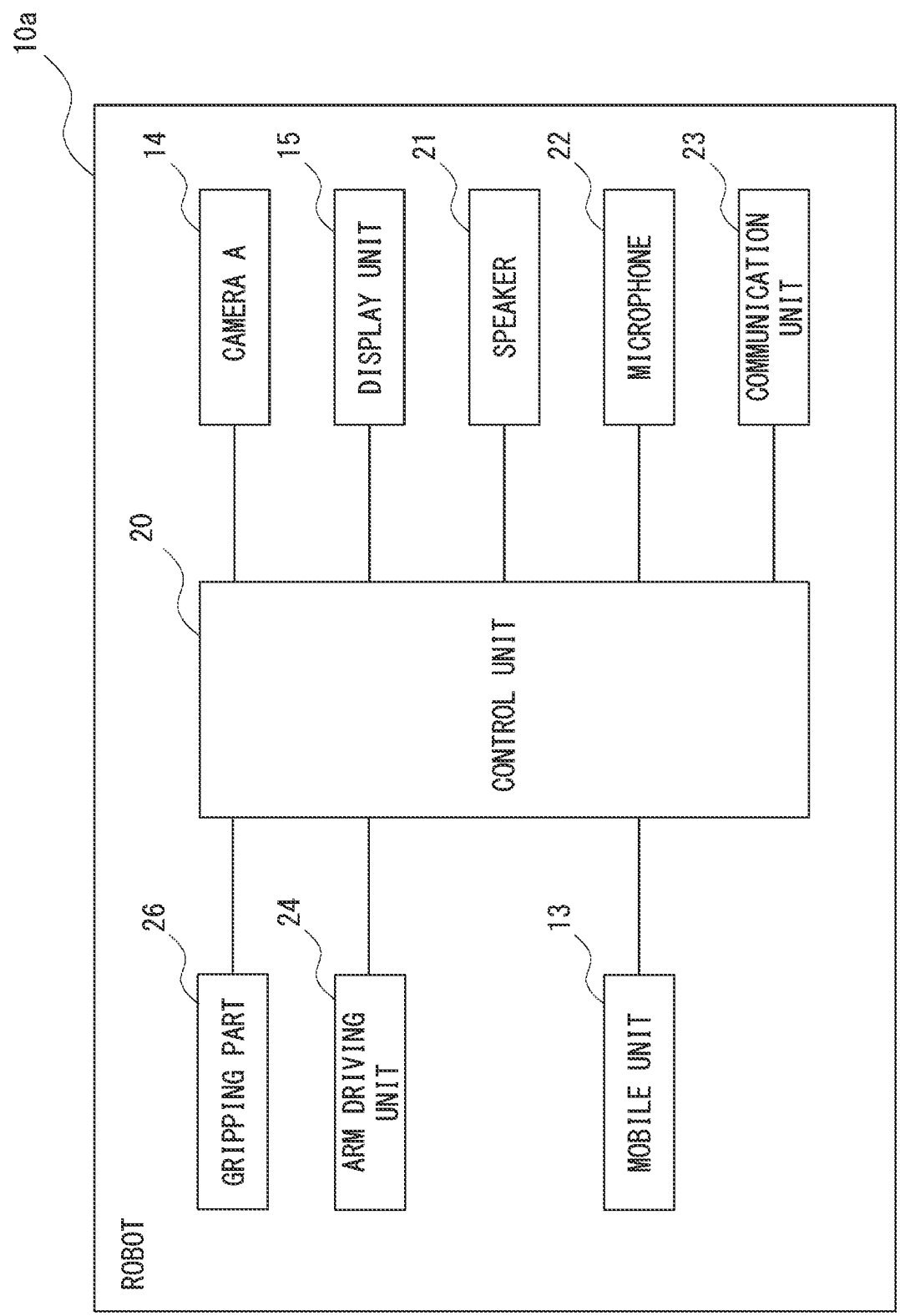
FIG. 3 is a block diagram showing a system configuration of the robot.

Next, a system configuration of the robot 10a will be described. FIG. 3 is a block diagram for describing a system configuration of one robot. As shown in FIG. 3, the robot 10a includes a control unit 20 for controlling the operation of the robot 10a. The mobile unit 13, the camera A (14), the display unit 15, a speaker 21, a microphone 22, a communication unit 23, an arm driving unit 24, and the gripping part 26 are connected to the control unit 20.

The mobile unit 13 drives wheels (not shown) of the mobile unit 13 based on a control signal supplied from the control unit 20. By driving these wheels, the robots 10a and 10b can be moved. The control unit 20 is able to generate, for example, control signals for controlling the mobile unit 13 based on an operation signal transmitted from the operation terminal 30 (the management server 40). Further, the control unit 20 may detect an obstacle which is near the robot 10a using information acquired from the camera A (14) or a laser scanner (not shown) and generate a control signal using the information regarding the detected obstacle.

Accordingly, the control unit 20 is able to control the mobile unit 13 in such a way that the robot 10a moves while avoiding the obstacle.

The control unit 20 transmits image data acquired from the camera A (14) to the operation terminal 30 via the communication unit 23.

The control unit 20 displays image data transmitted from the operation terminal 30, that is, an image of the remote operator M60 who is operating the operation terminal 30 on the display unit 15. Further, the control unit 20 outputs voice data transmitted from the operation terminal 30, that is, voice of the remote operator M60 who is operating the operation terminal 30 from the speaker 21. Further, the control unit 20 transmits voice data acquired by the microphone 22, that is, voice of the service receiver C50, to the operation terminal 30 via the communication unit 23.

The arm driving unit 24, which is used for driving the arm 16, can be formed, for example, using a motor or the like. The arm driving unit 24 drives the arm 16 based on the control signal supplied from the control unit 20. The arm 16 can thus be moved. For example, by moving the arm 16, the position of the gripping part 26 can be adjusted.

The control unit 20 supplies the control signal to the gripping part 26. The gripping part 26 grips a target object to be gripped or stops gripping this object based on the supplied control signal.

The communication unit 23 is configured in such a way that it can communicate with the operation terminal 30 via the management server 40. For example, the communication unit 23 is connected to the management server 40 via a wire or wirelessly.

Figure 4:
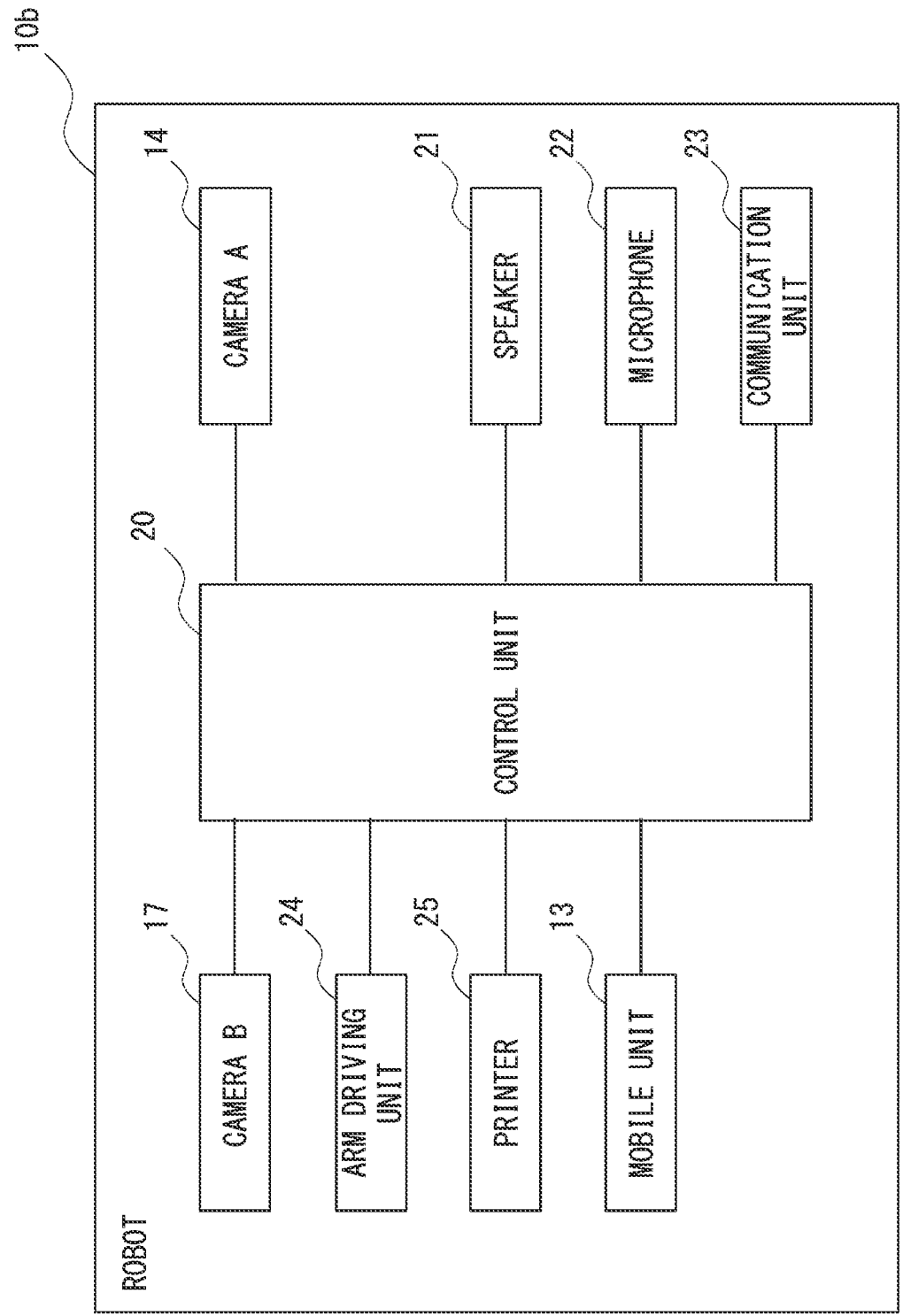
FIG. 4 is a block diagram showing a system configuration of another robot.

Next, a system configuration of the robot 10b will be described. FIG. 4 is a block diagram for describing the system configuration of the other robot. As shown in FIG. 4, the robot 10b includes a control unit 20 for controlling the operation of the robot 10b. The robot 10b has a configuration the same as that of the robot 10a except that the display unit 15 and the gripping part 26 are not provided in the robot 10b and a camera B (17) and a printer 25 are further included in the robot 10b.

The control unit 20 transmits image data acquired from the camera B (17) to the operation terminal 30 via the communication unit 23. At this time, the control unit 20 may selectively transmit the image data acquired from the camera A (14) and the image data acquired from the camera B (17) to the operation terminal 30. The position of the camera B (17) can be adjusted by moving the arm 16.

The control unit 20 is configured to be able to transmit the image data acquired from the camera B (17) (image data of the service receiver C50) to the printer 25. The printer 25 prints the photo based on the image data acquired from the control unit 20.

Note that the above configurations of the robot 10a and the robot 10b are merely examples and the configurations of the robots 10a and 10b are not limited to the above ones in the remote operation system 1 according to this embodiment.

Configuration of Operation Terminal

Figure 5:
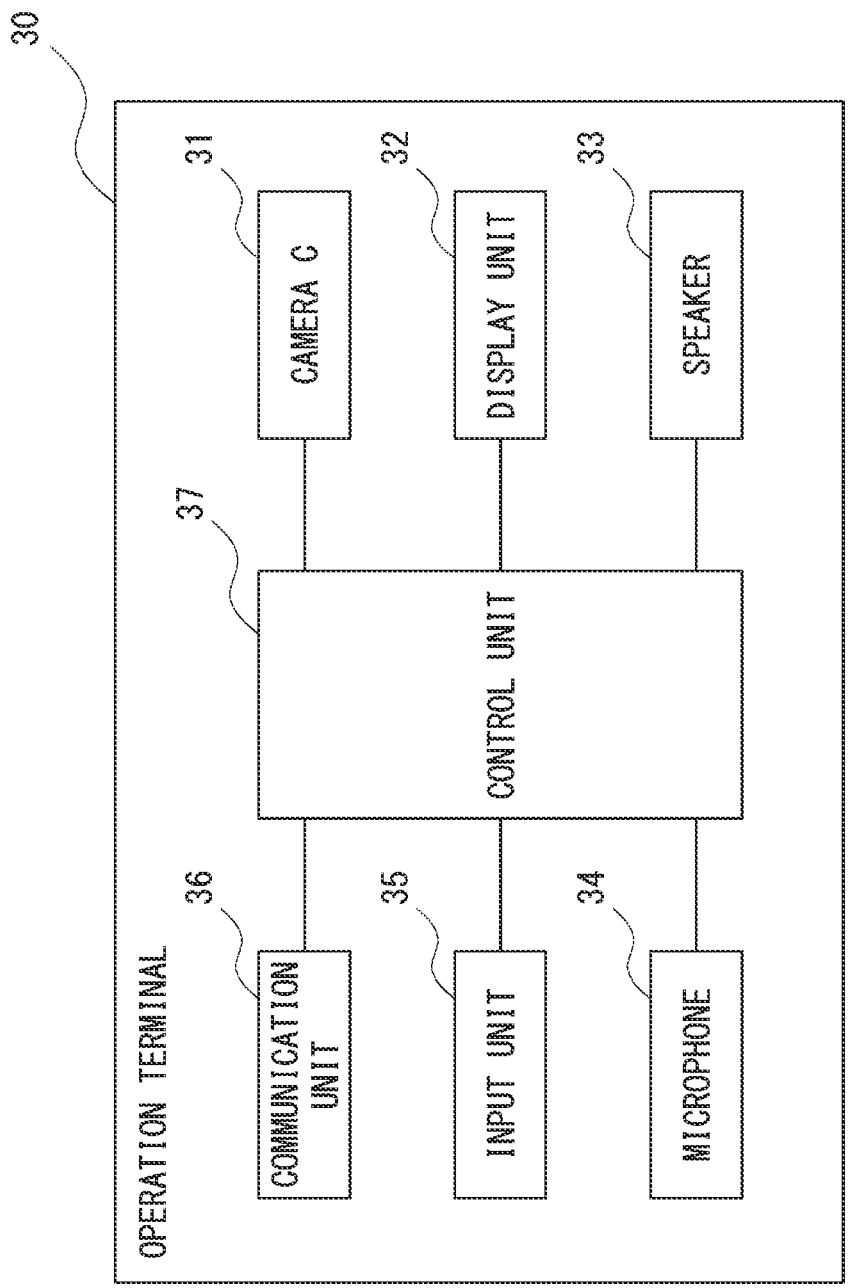
FIG. 5 is a block diagram showing a system configuration of an operation terminal.

Next, the operation terminal 30 will be described. As shown in FIG. 1, the operation terminal 30, which is a terminal for enabling the remote operator M60 to remotely operate the robots 10a and 10b, may be formed using, for example, a personal computer or a tablet terminal. FIG. 5 is a block diagram for describing a system configuration of the operation terminal. As shown in FIG. 5, the operation terminal 30 includes the camera C(31), the display unit 32, a speaker 33, a microphone 34, an input unit 35, a communication unit 36, and a control unit 37. The control unit 37 includes a function of controlling the operation terminal 30, and the camera C(31), the display unit 32, the speaker 33, the microphone 34, the input unit 35, and the communication unit 36 are connected to the control unit 37.

The control unit 37 transmits image data acquired from the camera C(31) to the robot 10a via the communication unit 36. The image data transmitted to the robot 10a is displayed on the display unit 15 of the robot 10a.

Further, the control unit 37 displays image data transmitted from the robots 10a and 10b such as an image of the service receiver C50 on the display unit 32. Further, the control unit 37 outputs voice data transmitted from the robots 10a and 10b such as voice of the service receiver C50 who is standing in front of the robot 10a from the speaker 33. Further, the control unit 20 transmits voice data acquired by the microphone 34, that is, voice of the remote operator M60 who is operating the operation terminal 30 to the robots 10a and 10b via the communication unit 36.

The input unit 35 is used for inputting various kinds of information for enabling the remote operator M60 to remotely operate the robots 10a and 10b. For example, the input unit 35 may be formed using a touch panel or a keyboard. When the input unit 35 is formed using a touch panel, for example, the robots 10a and 10b can be remotely operated by the remote operator M60 pressing an icon or the like displayed on the display unit 32. Further, when the input unit 35 is formed using a keyboard, for example, the robots 10a and 10b can be remotely operated by inputting predetermined information using the keyboard.

The communication unit 36 is configured to be able to communicate with the robots 10a and 10b via the management server 40. For example, the communication unit 36 is connected to the management server 40 via a wire or wirelessly.

Note that the configuration of the operation terminal 30 is one example and it is not limited to the aforementioned configuration in the remote operation system 1 according to this embodiment.

Configuration of Management Server

Figure 6:
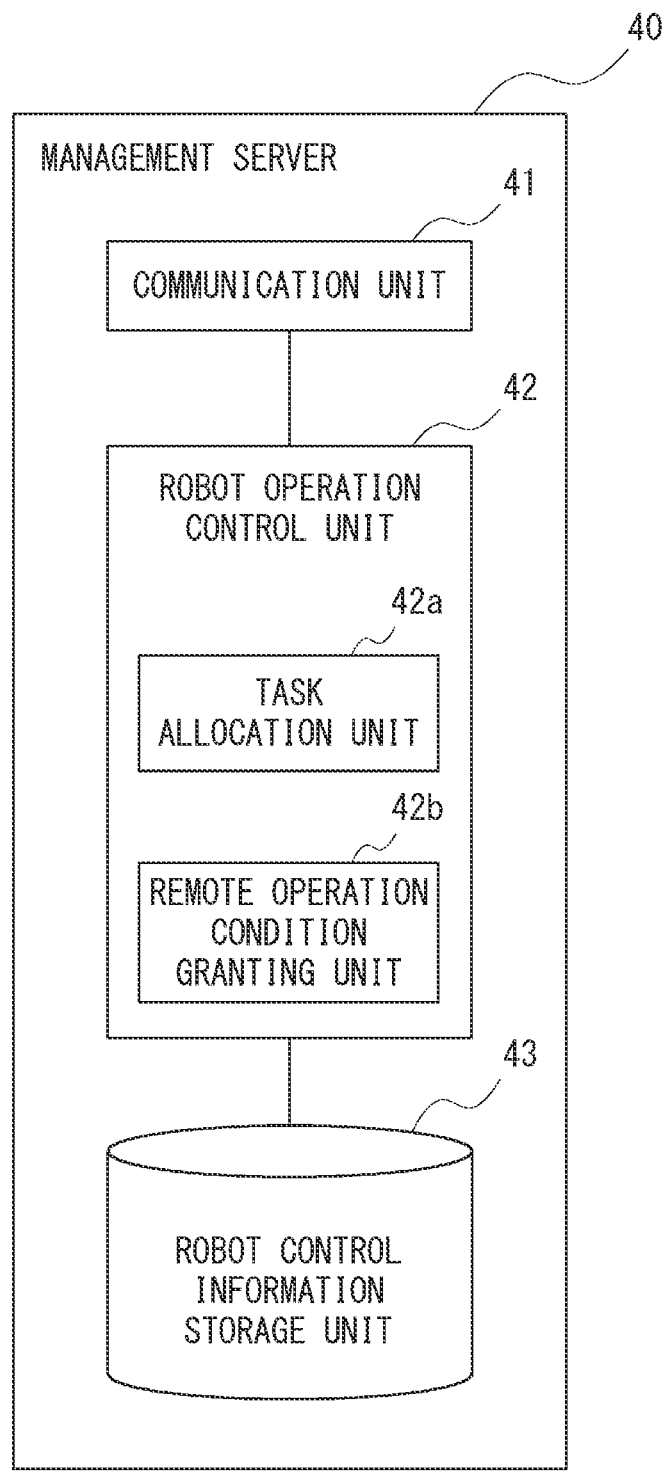
FIG. 6 is a block diagram showing a system configuration of a management server.

Next, the management server 40 will be described. As shown in FIG. 1, the management server 40 is a server for managing the robots 10a and 10b. The robot 10a, the robot 10b, and the operation terminal 30 are configured in such a way that they can communicate with one another via the management server 40. FIG. 6 is a block diagram for describing a system configuration of the management server. As shown in FIG. 6, the management server 40 includes a communication unit 41, a robot operation control unit 42, and a robot control information storage unit 43.

The communication unit 41 is configured to be able to communicate with the communication unit 23 of each of the robots 10a and 10b (see FIGS. 3 and 4) and the communication unit 36 of the operation terminal 30 (see FIG. 5). The communication unit 41 is connected, for example, to the communication unit 23 of each of the robots 10a and 10b and the communication unit 36 of the operation terminal 30 via a wire or wirelessly.

The robot operation control unit 42 is an arithmetic apparatus such as a Central Processing Unit (CPU) or a Micro Processing Unit (MPU) that controls electronic circuits and apparatuses. The robot control information storage unit 43 is a storage device that stores various kinds of data such as a program or robot control information. The robot operation control unit 42 controls operations of robots based on robot control information stored in the robot control information storage unit 43. That is, in the remote operation system 1 according to this embodiment, the types of the operations of the robots 10*a* and 10*b* and the order of these operations (i.e., the scenario regarding the operations of the robots) are determined in advance, and these pieces of information are stored in the robot control information storage unit 43 in advance as the robot control information.

The robot operation control unit 42 acquires the current status information of the robot 10*a* and the robot 10*b* from the robot 10*a* and the robot 10*b*. Then, the robot operation control unit 42 refers to the current status information of the robot 10*a* and the robot 10*b* hat has been acquired and the robot control information stored in the robot control information storage unit 43 and creates information regarding the next control content (the next scenario) of the robots 10*a* and 10*b*. The information regarding the next control content of the robots 10*a* and 10*b* is determined in accordance with a service provided for the service receiver C50. This service is, for example, a group photo capturing service, a distribution service, or a recovery service.

The above service includes a plurality of tasks. The group photo capturing service includes, for example, a task as a subject and a capturing task.

The distribution service includes, for example, a communication task and a handing task. The recovery service includes, for example, a communication task and a recovery task.

The plurality of tasks can be allocated to the respective robots 10*a* and 10*b*. The robot operation control unit 42 includes a task allocation unit 42*a* and a remote operation condition granting unit 42*b*. The task allocation unit 42*a* refers to the above current status information of the robot 10*a* and the robot 10*b* hat has been acquired and the above robot control information and allocates the plurality of tasks to the respective robots 10*a* and 10*b*. Note that the remote operator M60 may allocate the plurality of tasks to the respective robots 10*a* and 10*b* by inputting necessary information into the operation terminal 30.

The remote operation condition granting unit 42*b* grants remote operation conditions to the respective robots 10*a* and 10*b* in accordance with the plurality of tasks. The remote operation condition indicates, for example, a remote operation performed by the remote operator M60 or autonomous control. The robots 10*a* and 10*b* are remotely operated in accordance with the remote operation conditions granted thereto. For example, the robots 10*a* and 10*b* are able to execute tasks by the remote operation performed by the remote operator M60 or by autonomous control.

The robot operation control unit 42 transmits information regarding the next control content (the next scenario) of the robots 10*a* and 10*b* that has been created to the operation terminal 30.

After that, the display unit 32 of the operation terminal 30 displays information regarding the next control content (the next scenario) of the robots 10*a* and 10*b*. For example, the display unit 32 of the operation terminal 30 displays a recommendation for the next operation of the robots 10*a* and 10*b* and the remote operator M60 is able to perform a remote operation in accordance with the aforementioned content. Further, the display unit 32 of the operation terminal 30 displays icons for allowing the remote operator M60 to select the next operation of the robots 10*a* and 10*b*. The remote operator M60 is able to determine the next operation of the robots 10*a* and 10*b* by pressing one of these icons.

For example, the remote operator M60 is able to determine the service to be provided for the service receiver C50 by pressing an icon indicating a predetermined service. The remote operator M60 is able to determine allocation of a predetermined task to the robot 10*a* or 10*b* by pressing an icon indicating the predetermined task and the robot 10*a* or 10*b*. Further, the remote operator M60 presses an icon indicating an operation included in this task, thereby causing the robot 10*a* or 10*b* to execute this operation. The remote operator M60 causes the robots 10*a* and 10*b* to execute a task included in the predetermined service by pressing the icon indicating the predetermined service.

The information regarding the next operation of the robots 10*a* and 10*b* determined by the remote operator M60 (information regarding the selected scenario) is transmitted to the robots 10*a* and 10*b* via the management server 40. The robots 10*a* and 10*b* perform operations based on the received information regarding the next operation (information regarding the selected scenario).

In the remote operation system 1 according to this embodiment, the aforementioned operations, that is, acquisition of the current status information of the robot 10*a* and the robot 10*b*, generation of the next control content (the next scenario) of the robots 10*a* and 10*b*, and determination of the next operation of the robots 10*a* and 10*b*, are repeated, whereby the robots 10*a* and 10*b* can be operated. The management server 40 manages progression of the control content (scenario) of the robots 10*a* and 10*b*. Further, the remote operation conditions may be defined in accordance with the content of the plurality of tasks that have been allocated to the respective robots 10*a* and 10*b*, whereby the robots 10*a* and 10*b* can be remotely operated. Therefore, the whole amount of the remote operation is reduced due to the remote operation conditions. It is therefore possible to prevent the burden on one remote operator when this person remotely operates the robots 10*a* and 10*b* in parallel from increasing.

Note that the control content (scenario) of the robots 10*a* and 10*b* may be changed as appropriate depending on the scene where the robots 10*a* and 10*b* are used. The control content (scenario) of the robots 10*a* and 10*b* may be changed by rewriting the robot control information stored in the robot control information storage unit 43. The management server 40 may be configured to manage a plurality of robots. Further, the management server 40 may be configured as a system that is the same as the operation terminal 30.

Description of First Example of Operation of Remote Operation System

Next, a first example of the operation of the remote operation system according to this embodiment will be described with reference to the flowchart shown in FIG. 7 and the schematic view shown in FIG. 8. In the following description, as one example of the operations of the robots 10*a* and 10*b*, an operation in which the robot 10*a* searches for the service receiver (a search mode) and then communicates with the service receiver (a communication mode), and the robot 10*b* captures a group photo including the robot 10*a* and the service receiver (a group photo capturing mode) will be described. In one example of this operation, a service for capturing a group photo including the robot 10*a* and the service receiver is provided for the service receiver.

First, the robot 10*a* performs an operation for searching for the service receiver (Step S1). For example, the remote operator M60 operates the operation terminal 30 and selects the scenario of the search mode as the operation mode of the robot 10*a*. Accordingly, the operation mode of the robot 10*a* is set to the search mode. For example, the robot 10*a* is able to search for the service receiver using the camera A (14). Further, the robot 10*a* is able to expand the range in which the service receiver is searched for by travelling its surroundings.

After that, the robot 10*a* determines whether the service receiver is able to communicate with someone (Step S2). When, for example, a person is shown in the camera A (14) of the robot 10*a*, the robot 10*a* talks to this person to check if this person is willing to be a communication partner. When this person has not consented to be a communication partner (Step S2: No), the robot 10*a* continues to search for a service receiver (Step S1).

On the other hand, when this person has consented to be a communication partner (Step S2: Yes), the remote operator M60 of the operation terminal 30 starts communicating with this person via the robot 10*a* (Step S3). Specifically, the remote operator M60 operates the operation terminal 30 and selects the scenario of the communication mode as the operation mode of the robot 10*a*. The video image of the service receiver C50 who is in front of the robot 10*a* is displayed on the display unit 32 of the operation terminal 30 of the remote operator M60. Further, the video image of the remote operator M60 who is operating the operation terminal 30 is displayed on the display unit 15 of each of the robots 10*a* and 10*b*. Therefore, the service receiver C50 and the remote operator M60 are able to make a face-to-face conversation and communicate with each other.

After that, the robot 10*a* (the remote operator M60) asks the service receiver C50 if the service receiver C50 permits a group photo including the robot 10*a* and the service receiver C50 to be captured (Step S4). When the service receiver C50 has permitted a group photo to be captured (Step S4: Yes), the remote operator M60 starts providing the group photo capturing service for this person via the robots 10*a* and 10*b* (Step S5). Specifically, the remote operator M60 operates the operation terminal 30 and selects the scenario of the group photo capturing service as a service provided by the robots 10*a* and 10*b*. In the scenario of the group photo capturing service, a task as a subject is allocated to the robot 10*a* in advance and the capturing task is allocated to the robot 10*b* in advance. Note that the remote operator M60 may operate the operation terminal 30 and allocate the task as the subject to the robot 10*a* and allocate the capturing task to the robot 10*b*.

Next, the robot 10*a* adjusts its position, its orientation, and its posture so that the robot 10*a* serves as a subject of the group photo including the robot 10*a* and the service receiver C50 (Step S6). Specifically, the robot 10*a* comes close to the service receiver C50 by autonomous control and moves to a position where the group photo including the robot 10*a* and the service receiver C50 can be captured. Next, the robot 10*a* adjusts the distance between the robot 10*a* and the service receiver C50, and the position, the orientation, and the posture of the robot 10*a* and those of the arm 16 of the robot 10*a* in view of the situation of the service receiver C50 and an estimated photo by the remote operation performed by the remote operator M60. In some embodiments, the remote operator M60 performs the remote operation in view of features of the service receiver C50 such as the physical size of the service receiver C50, which enables the robot 10*a* to make adjustments suitable for the service receiver C50. The remote operator M60 may communicate with the service receiver C50 via the robot 10*a* that is remotely operated as needed.

Next, the robot 10*b* adjusts the camera B (17) for capturing a group photo including the robot 10*a* and the service receiver C50 (Step S7). Specifically, the robot 10*b* moves to a position where the group photo can be captured and adjusts the position and the angle of view of the camera B (17) by autonomous control. Note that Steps S6 and S7 may be executed in parallel.

Next, the robot 10*b* captures a group photo including the robot 10*a* and the service receiver C50 by autonomous control (Step S8). For example, the operation terminal 30 displays a shutter button, and the remote operator M60 is able to capture the group photo by pressing the shutter button.

When the remote operator M60 has captured a plurality of photos in Step S7, the remote operator M60 selects one of the plurality of photos that have been captured to be handed to the service receiver C50 (Step S9). At this time, a plurality of photos may be captured by repeating the operations of Steps S6 and S7. When the number of photos that have been captured in Step S7 is one, the operation in Step S9 may be omitted.

After that, the remote operator M60 operates the operation terminal 30 and sends an instruction to the robot 10*b* to print the photo selected in Step S9. The robot 10*b* prints the group photo that shows the service receiver C50 using the printer that is included in the robot 10*b* by autonomous control to acquire the printed photo. Further, the robot 10*a* takes out the printed photo from the take-out port 18 of the robot 10*b* and hands out this printed photo to the service receiver C50 (Step S9). This printed photo may be handed out to the service receiver C50 via the take-out port 18. The group photo capturing service is thus ended (Step S10). Specifically, the robot 10*b* comes close to the robot 10*a* by autonomous control. The robot 10*a* grips this printed photo with the gripping part 26 of the arm 16 by autonomous control. The robot 10*a* hands out this gripped printed photo to the service receiver C50 by the remote operation performed by the remote operator M60. In some embodiments, the remote operator M60 performs the remote operation in view of features of the service receiver C50 such as the physical size of the service receiver C50, which enables the robot 10*a* to appropriately hand the printed photo to the service receiver C50. Step S9 may be omitted as appropriate.

When the service receiver C50 has not consented to capture a photo of the service receiver C50 in Step S4 (Step S4: No), the operator of the operation terminal 30 continues a conversation (communication) with the service receiver via the robot 10*a* (Step S11). In this case, the group photo capturing mode in Steps S5-S10 is omitted.

By ending the aforementioned operations, the communication between the remote operator M60 of the operation terminal 30 and the service receiver C50 via the robots 10*a* and 10*b* is ended (Step S12). In the following process, by repeating the operations in Steps S1-S12, the robot 10*a* (the remote operator M60) is able to further communicate with another service receiver C50.

In this embodiment, the operations of the robots 10*a* and 10*b* are determined in advance by the robot control information (scenario) stored in the robot control information storage unit 43 of the management server 40. Further, the display unit 32 of the operation terminal 30 displays information regarding the next control content (the next scenario) of the robots 10*a* and 10*b*. For example, the display unit 32 of the operation terminal 30 displays icons for enabling the operator to select the next operation of the robots 10*a* and 10*b*, and the operator can determine the next operation of the robots 10*a* and 10*b* by pressing this icon. In this manner, in this embodiment, the operator is able to determine the next operation of the robots 10a and 10b by pressing an icon displayed on the display unit 32 of the operation terminal 30. It is therefore possible to prevent the operation of the robot by the remote operator M60 from being complicated. Further, the next operation of the robots 10a and 10b is executed by the robot 10a or 10b by the remote operation performed by the remote operator M60 or by autonomous control depending on its content. Therefore, at least a part of the task can be executed by autonomous control of the robot 10a or 10b. Accordingly, at least a part of the remote operation of one of the robots 10a and 10b by the remote operator can be omitted. Therefore, the remote operator is able to concentrate on remotely operating the other one of the robots 10a and 10b, whereby the burden on the remote operator regarding the remote operation can be reduced.

Description of Second Example of Operation of Remote Operation System

Figure 9:
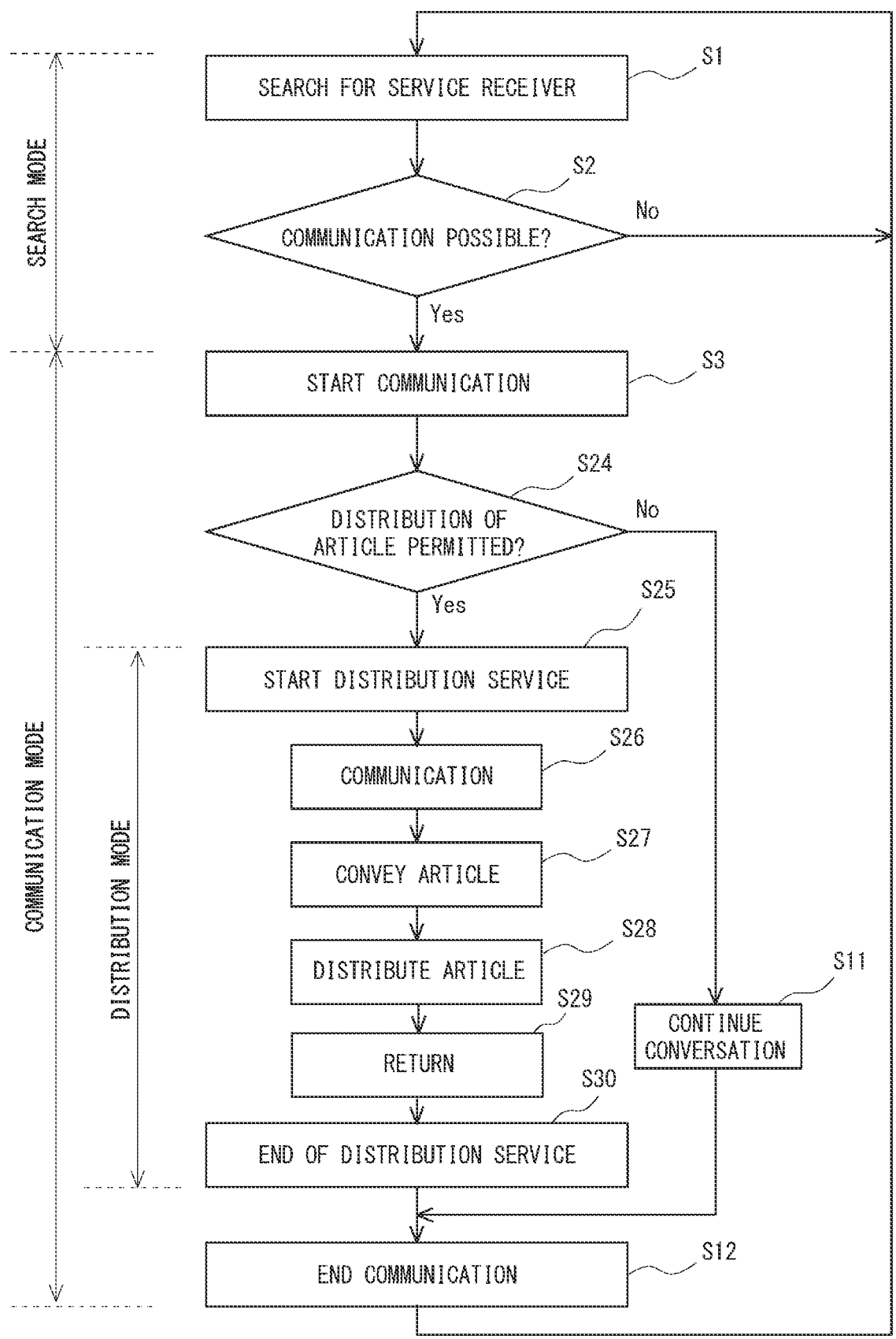
FIG. 9 is a flowchart of an operation of a second example of the remote operation system according to the first embodiment.
Figure 10:
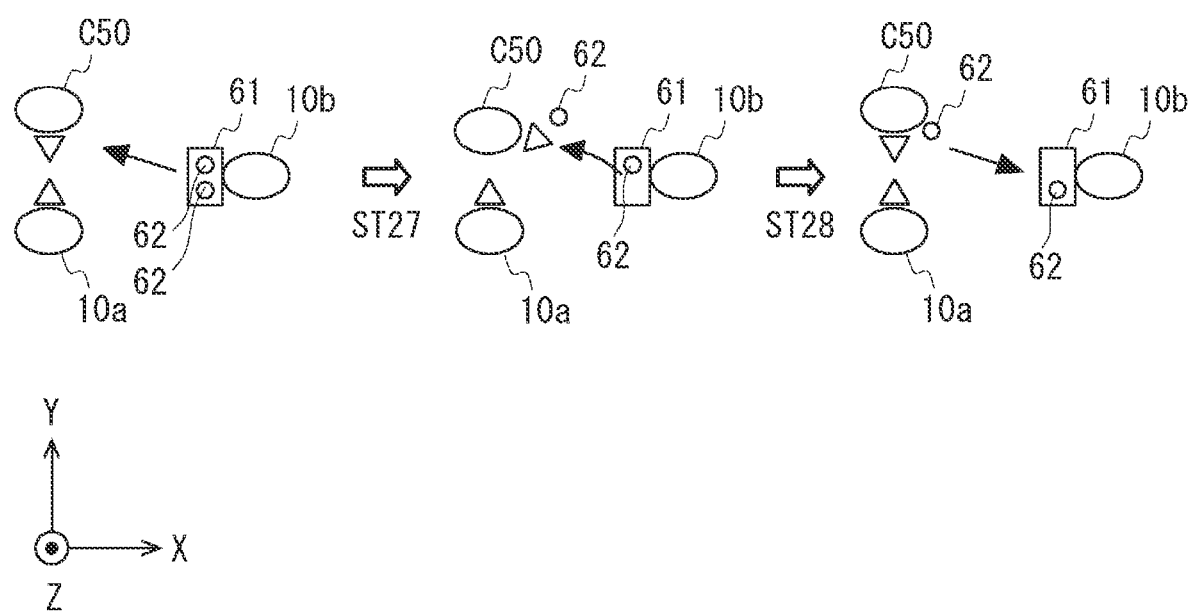
FIG. 10 is a schematic view showing an operation of the second example of the remote operation system according to the first embodiment.

Next, a second example of the operation of the remote operation system according to this embodiment will be described using the flowchart shown in FIG. 9 and the schematic view shown in FIG. 10. In the following description, as one example of the operations of the robots 10a and 10b, an operation in which the robot 10a searches for the service receiver (a search mode), the robot 10a then communicates with the service receiver (a communication mode), and the robot 10b distributes an article to the service receiver (a distribution mode) will be described. That is, in one example of this operation, the service for distributing the article to the service receiver is provided for the service receiver. Note that the robot 10b includes a holder 61 and the holder 61 holds an article 62. The article 62 may be a desired object such as a bottled drinking water that can be distributed.

Figure 7:
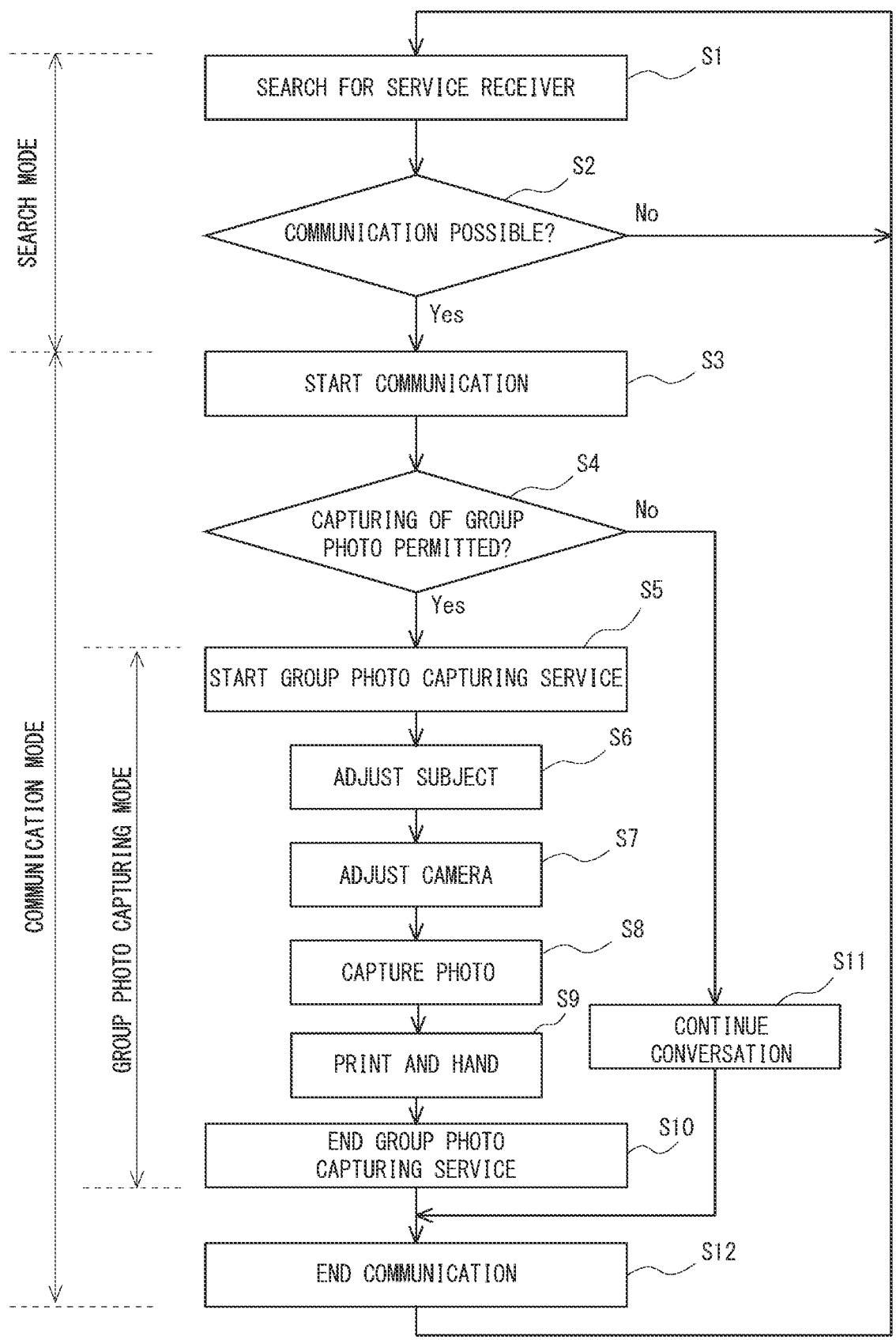
FIG. 7 is a flowchart of an operation of a first example of the remote operation system according to the first embodiment.
Figure 8:
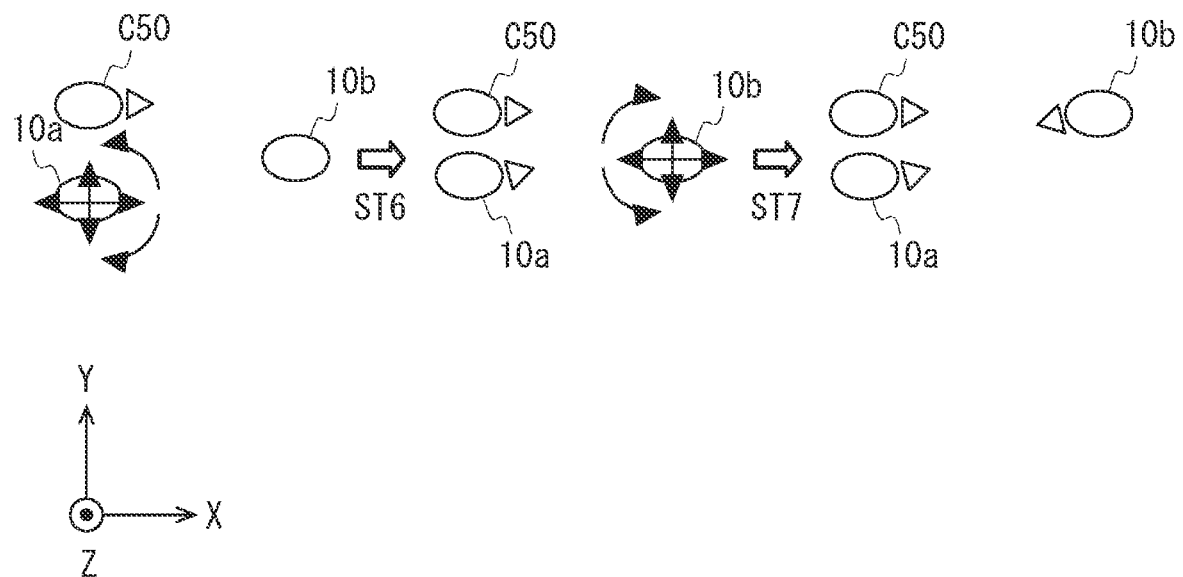
FIG. 8 is a schematic view showing an operation of the first example of the remote operation system according to the first embodiment.

First, Steps S1-S3 are executed, like in the first example of the operation of the remote operation system shown in FIGS. 7 and 8.

After that, the robot 10a (the remote operator M60) asks the service receiver C50 if the service receiver C50 is willing to have the article 62 (see FIG. 10) distributed (Step S24). When the service receiver C50 has permitted the article to be distributed (Step S24: Yes), the remote operator M60 starts providing the distribution service for this person via the robots 10a and 10b (Step S25).

Specifically, the remote operator M60 operates the operation terminal 30 and selects the scenario of a distribution service as the service provided by the robots 10a and 10b. In the scenario of the distribution service, a communication task is allocated to the robot 10a in advance and the distribution task is allocated to the robot 10b in advance. The remote operator M60 may operate the operation terminal 30, allocate the communication task to the robot 10a, and allocate the distribution task to the robot 10b.

Next, the robot 10a (the remote operator M60) communicates with the service receiver C50 (Step S26). The content of this communication includes, for example, description of the article 62 and intention of distributing the article 62. In some embodiments, the remote operator M60 performs the remote operation in view of the features of the service receiver C50, for example, how well the service receiver C50 knows about the article 62, which enables the robot 10a to appropriately communicate with the service receiver C50.

Next, the robot 10b comes close to the service receiver C50 from a predetermined position by autonomous control and conveys the article 62 (Step S27). The predetermined position is, for example, a place where articles that are of the same type as the article 62 are accumulated. Specifically, the robot 10b may drive the arm 16 and adjust the position of the holder 61 by a remote operation performed by the remote operator M60.

Next, the robot 10b holds the holder 61 toward the service receiver C50 and distributes the article 62 to the service receiver C50 by autonomous control (Step S28). In Step S28, the robot 10a (the remote operator M60) may send a message to the service receiver C50 for prompting the service receiver C50 to receive the article 62.

Further, the robot 10a may retrieve the article 62 from the holder 61 of the robot 10b and hand out this article 62 to the service receiver C50. Specifically, the robot 10a grips the article 62 with the gripping part 26 of the arm 16 by autonomous control. The robot 10a hands out the gripped article 62 to the service receiver C50 by a remote operation performed by the remote operator M60. The information on the service receiver C50 is not likely to be acquired in advance, and the service receiver C50 tends to be changed to another person every time Step S3 is started. Therefore, in some embodiments, the remote operator M60 performs the remote operation in view of features of the service receiver C50 such as the physical size of the service receiver C50, which enables the article 62 to be properly distributed to the service receiver C50.

The robot 10b returns to the original predetermined position by autonomous control (Step S29). The distribution service is thus ended (Step S30). When the service receiver C50 has not consented to having the article 62 to be distributed in Step S24 (Step S24: No), the operator of the operation terminal 30 continues the conversation (communication) with the service receiver via the robot 10a (Step S11). In this case, the distribution mode in Steps S25-S30 can be omitted.

By ending the aforementioned operations, the communication between the remote operator M60 of the operation terminal 30 and the service receiver C50 via the robots 10a and 10b is ended (Step S12). In the following process, by repeating the operations in Steps S1-S3, S24-S30, S11, and S12, the robot 10a (the remote operator M60) is able to further communicate with another service receiver C50.

Like in the first example of the operation of the remote operation system shown in FIGS. 7 and 8, in this embodiment, the operator presses an icon displayed on the display unit 32 of the operation terminal 30, whereby the next operation of the robots 10a and 10b can be determined. It is therefore possible to prevent the operation of the robot by the remote operator M60 from being complicated. Further, like in the first example of the operation of the remote operation system shown in FIGS. 7 and 8, the next operation of the robots 10a and 10b is executed by the robot 10a or 10b by the remote operation performed by the remote operator M60 or by autonomous control depending on its content. Therefore, at least a part of the task can be executed by the autonomous control by the robot 10a or 10b. Therefore, at least a part of the remote operation of one of the robots 10a and 10b by the remote operator can be omitted. Accordingly, the remote operator is able to concentrate on remotely operating the other one of the robots 10a and 10b, whereby the burden on the remote operator regarding the remote operation can be reduced.

Description of Third Example of Operation of Remote Operation System

Figure 11:
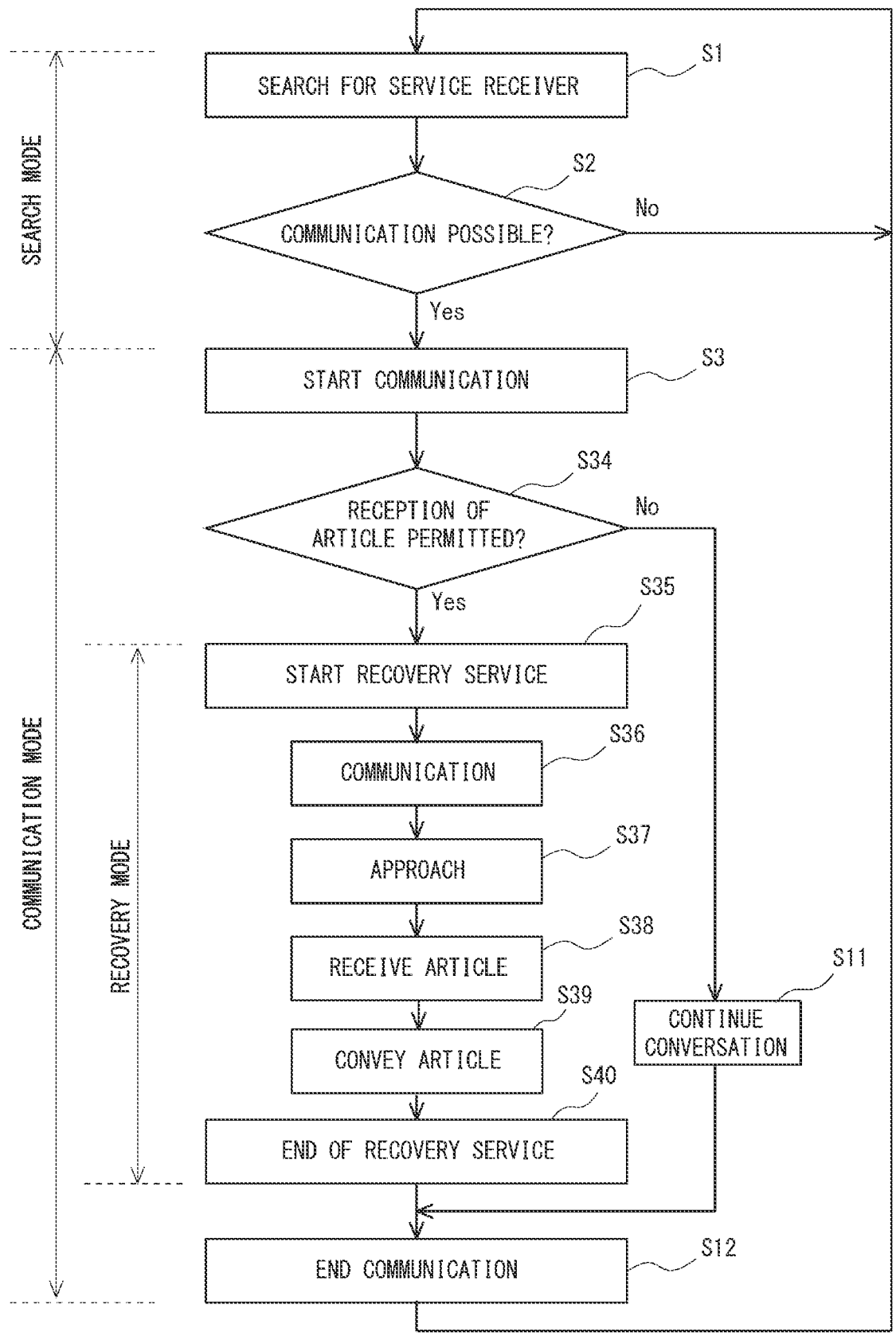
FIG. 11 is a flowchart of an operation of a third example of the remote operation system according to the first embodiment.
Figure 12:
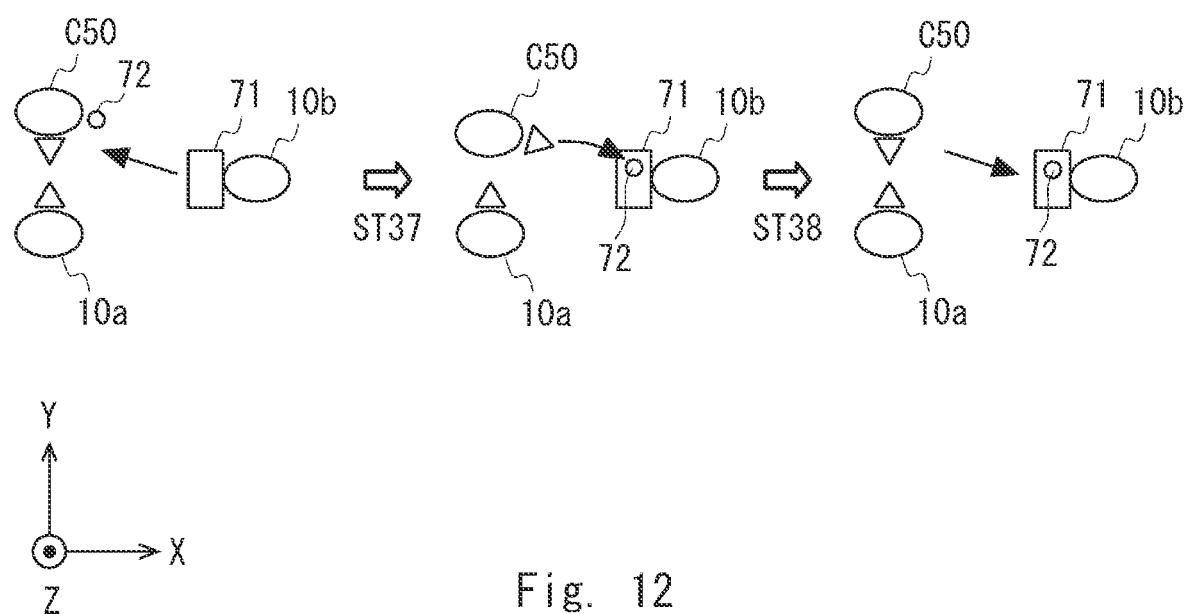
FIG. 12 is a schematic view showing an operation of the third example of the remote operation system according to the first embodiment.

Next, a third example of the operation of the remote operation system according to this embodiment will be described with reference to the flowchart shown in FIG. 11 and the schematic view shown in FIG. 12. In the following description, as one example of the operations of the robots 10a and 10b, an operation in which the robot 10a searches for the service receiver (a search mode), the robot 10a then communicates with the service receiver (a communication mode), and the robot 10b recovers an article from the service receiver (a recovery mode) will be described. That is, in one example of this operation, the service to recover an article from the service receiver is provided for the service receiver. The robot 10b includes a container 71 that can accommodate an article 72. The article 72 is, specifically, an object that the service receiver C50 no longer needs or an object that should be recovered for the sake of the remote operator. The article 72 may be, more specifically, garbage or an object that has been lent to the service receiver C50.

First, like in the first example of the operation of the remote operation system shown in FIGS. 7 and 8, Steps S1-S3 are executed.

After that, the robot 10a (the remote operator M60) asks the service receiver C50 if the service receiver C50 is willing to have the article 72 (see FIG. 12) recovered (Step S34). When the service receiver C50 has permitted an article to be recovered (Step S34: Yes), the remote operator M60 starts providing the recovery service for this person via the robots 10a and 10b (Step S35). Specifically, the remote operator M60 operates the operation terminal 30 and selects the scenario of the recovery service as the service provided by the robots 10a and 10b. In the scenario of the recovery service, a communication task is allocated to the robot 10a in advance and a recovery task is allocated to the robot 10b in advance. The remote operator M60 may allocate the communication task to the robot 10a and allocate the recovery task to the robot 10b by operating the operation terminal 30.

Next, the robot 10a (the remote operator M60) communicates with the service receiver C50 (Step S36). The content of this communication includes, for example, promotion of the recovery of the article 72 and the description of the intention of the recovery. In some embodiments, the remote operator M60 performs the remote operation in view of the features of the service receiver C50, for example, how well the service receiver C50 knows about the recovery of the article 72, which enables the robot 10a to appropriately communicate with the service receiver C50.

Next, the robot 10b comes close to the service receiver C50 from a predetermined position by autonomous control (Step S37). The predetermined position is, for example, a place where articles of the same type as the article 72 are accumulated.

Next, the robot 10b holds the container 71 toward the service receiver C50 by autonomous control (Step S38). After the service receiver C50 puts the article 72 on the container 71, the robot 10b is able to recover the article 72 from the service receiver C50. The robot 10b may drive the arm 16 and adjust the position of the container 71 by a remote operation performed by the remote operator M60. In some embodiments, the remote operator M60 performs the remote operation in view of features of the service receiver C50 such as the physical size of the service receiver C50, which enables the robot 10b to appropriately recover the article 72 from the service receiver C50. In Step S38, the robot 10a (the remote operator M60) may send a message to the service receiver C50 for prompting the recovery of the article 72.

Further, the robot 10a may receive the article 72 from the service receiver C50 and accommodate the received article 72 in the container 71 of the robot 10b. Specifically, the robot 10a receives the article 72 from the service receiver C50 with the gripping part 26 of the arm 16 by a remote operation performed by the remote operator M60. The robot 10a puts the article 72 on the container 71 by the remote operation performed by the remote operator M60. In some embodiments, the remote operator M60 performs the remote operation in view of features of the service receiver C50 such as the physical size of the service receiver C50, which enables the robot 10a to appropriately receive the article 72 from the service receiver C50.

The robot 10b returns to the original predetermined position by the autonomous control and conveys the article 72 (Step S39). The recovery service is thus ended (Step S40).

When the service receiver C50 has not consented to have the article 72 recovered in Step S34 (Step S34: No), the operator of the operation terminal 30 continues the conversation (communication) with the service receiver via the robot 10a (Step S11). In this case, the recovery mode in Steps S35-S40 is omitted.

By ending the aforementioned operations, the communication between the remote operator M60 of the operation terminal 30 and the service receiver C50 via the robots 10a and 10b is ended (Step S12). In the following process, the operations of Steps S1-S3, S34-S40, S11, and S12 are repeated, whereby the robot 10a (the remote operator M60) is able to further communicate with another service receiver C50.

Like in the first and second examples of the operation of the remote operation system shown in FIGS. 7-10, in this embodiment, the operator is able to determine the next operation of the robots 10a and 10b by pressing an icon displayed on the display unit 32 of the operation terminal 30. It is therefore possible to prevent the operation of the robot by the remote operator M60 from being complicated. Further, like in the first and second examples of the operation of the remote operation system shown in FIGS. 7-10, the next operation of the robots 10a and 10b is executed by the robot 10a or 10b by a remote operation performed by the remote operator M60 or autonomous control depending on its content. Therefore, at least a part of the task can be executed by the autonomous control by the robot 10a or 10b. Therefore, at least a part of the remote operation of one of the robots 10a and 10b by the remote operator can be omitted. Accordingly, the remote operator is able to concentrate on remotely operating the other one of the robots 10a and 10b, whereby the burden on the remote operator regarding the remote operation can be reduced.

In the aforementioned remote operation system 1, the configuration example including the camera A (14) used for the main operation of the robot 10b and the camera B (17) used to capture a photo of the communication partner has been described. However, in the remote operation system 1 according to this embodiment, only one camera may be mounted on the robot 10b. For example, the photo of the communication partner may be captured using the camera A (14).

In the above-described examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (such as mask ROM, Programmable ROM (PROM), Erasable PROM (EPROM), flash ROM, RAM, etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, as described in the examples of the processing in the remote operation system in the aforementioned various embodiments, the present disclosure may employ a form as a remote operation method executed in the remote operation system. One example of this information management method is shown in FIGS. 7, 9, and 11. The other examples have been described in the aforementioned embodiments. Further, it can be said that the aforementioned program(s) aim(s) to cause a remote operation system such as a management server to execute the aforementioned remote operation method.

While the present disclosure has been described along with the aforementioned embodiments, the present disclosure is not limited to the configurations of the aforementioned embodiments and naturally includes various modifications, corrections, and combinations that can be made by those skilled in the art within the scope of the present disclosure set forth in the claims.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote operation system in which a remote operator remotely operates a plurality of robots including a first robot and a second robot, thereby providing a service as a result of execution of a plurality of tasks for a service receiver including a first task allocated to the first robot and a second task allocated to the second robot, the remote operation system comprising a central processing unit configured to:
   allocate the plurality of tasks to the plurality of respective robots; and
   grant, to the plurality of respective robots, remote operation conditions in accordance with a content of the plurality of tasks that have been allocated to the plurality of respective robots, wherein
   the first robot communicates with the service receiver in a position where a group photo that shows the service receiver and the first robot can be captured by the first robot, and executes the first task by a remote operation performed by the remote operator in accordance with the remote operation condition,
   the second robot executes the second task by autonomous control in accordance with the remote operation condition,
   the second robot captures the group photo by autonomous control using an image-capturing apparatus,
   the second robot prints the group photo and acquires the printed photo by autonomous control in accordance with the granted remote operation condition, and
   the first robot grips the printed photo by autonomous control, and then hands the printed photo to the service receiver by the remote operation performed by the remote operator.

2. The remote operation system according to claim 1, wherein the second robot adjusts, by autonomous control, an angle of view before capturing the group photo using the image-capturing apparatus.

3. The remote operation system according to claim 1, wherein
   the first robot communicates with the service receiver by the remote operation performed by the remote operator, and
   the second robot conveys an article to the service receiver by autonomous control in accordance with the remote operation condition.

4. The remote operation system according to claim 1, wherein
   the first robot communicates with the service receiver by the remote operation performed by the remote operator, and
   the second robot moves to a place near the service receiver while holding a container and receives an article so that the article is placed on the container by autonomous control in accordance with the remote operation condition.

5. A remote operation method executed in a remote operation system in which a remote operator remotely operates a plurality of robots including a first robot and a second robot, thereby providing a service as a result of execution of a plurality of tasks for a service receiver including a first task allocated to the first robot and a second task allocated to the second robot, the remote operation method comprising:
   allocating the plurality of tasks to the plurality of respective robots; and
   granting, to the plurality of respective robots, remote operation conditions in accordance with a content of the plurality of tasks that have been allocated to the plurality of respective robots, wherein
   the first robot communicates with the service receiver in a position where a group photo that shows the service receiver and the first robot can be captured by the first robot, and executes the first task by a remote operation performed by the remote operator in accordance with the remote operation condition,
   the second robot executes the second task by autonomous control in accordance with the remote operation condition,
   the second robot captures the group photo by autonomous control using an image-capturing apparatus,
   the second robot prints the group photo and acquires the printed photo by autonomous control in accordance with the granted remote operation condition, and
   the first robot grips the printed photo by autonomous control, and then hands the printed photo to the service receiver by the remote operation performed by the remote operator.

6. A non-transitory computer readable medium storing a remote operation program executed by a computer that operates as a server in a remote operation system in which a remote operator remotely operates a plurality of robots including a first robot and a second robot via the server, thereby providing a service as a result of execution of a plurality of tasks for a service receiver including a first task allocated to the first robot and a second task allocated to the second robot, the remote operation program causing the computer to execute the following processing of:
   allocating the plurality of tasks to the plurality of respective robots; and
   granting, to the plurality of respective robots, remote operation conditions in accordance with a content of the plurality of tasks that have been allocated to the plurality of respective robots, wherein the first robot communicates with the service receiver in a position where a group photo that shows the service receiver and the first robot can be captured by the first robot, and executes the first task by a remote operation performed by the remote operator in accordance with the remote operation condition, the second robot executes the second task by autonomous control in accordance with the remote operation condition, the second robot captures the group photo by autonomous control using an image-capturing apparatus, the second robot prints the group photo and acquires the printed photo by autonomous control in accordance with the granted remote operation condition, and the first robot grips the printed photo by autonomous control, and then hands the printed photo to the service receiver by the remote operation performed by the remote operator.

* * * * *